(12) United States Patent
Dongo et al.

(10) Patent No.: US 9,182,115 B2
(45) Date of Patent: Nov. 10, 2015

(54) FLUID HEATING SYSTEM

(76) Inventors: Kenneth A. Dongo, Casco, ME (US);
Timothy Curran, Windham, ME (US)

( * ) Notice: Subject to any disclaimer, the term of this patent is extended or adjusted under 35 U.S.C. 154(b) by 1075 days.

(21) Appl. No.: 12/722,067

(22) Filed: Mar. 11, 2010

(65) Prior Publication Data
US 2010/0251973 A1 Oct. 7, 2010

Related U.S. Application Data

(60) Provisional application No. 61/202,569, filed on Mar. 12, 2009.

(51) Int. Cl.
*F24H 9/20* (2006.01)
*F23B 40/08* (2006.01)
*F23N 1/08* (2006.01)
(Continued)

(52) U.S. Cl.
CPC ............... *F23B 40/08* (2013.01); *F23N 1/082* (2013.01); *F24B 1/024* (2013.01); *F24D 3/10* (2013.01); *F24D 3/1083* (2013.01); *F24D 12/02* (2013.01); *F24D 17/0031* (2013.01); *F24D 19/1051* (2013.01); *F24H 1/202* (2013.01); *F24H 1/205* (2013.01); *F24H 9/122* (2013.01); *F24H 9/124* (2013.01); *F24H 9/2057* (2013.01); *F23K 2203/202* (2013.01); *F23N 2025/19* (2013.01); *F24D 2200/067* (2013.01); *F24D 2200/08* (2013.01); *F24H 2230/00* (2013.01);
(Continued)

(58) Field of Classification Search
USPC ............................................... 122/14.1, 16.1
See application file for complete search history.

(56) References Cited

U.S. PATENT DOCUMENTS

| 659,971 A | 10/1900 | Hower | |
| 3,896,992 A * | 7/1975 | Borovina et al. | ............... 237/19 |

(Continued)

FOREIGN PATENT DOCUMENTS

| CA | 2 451 428 | 5/2005 |
| WO | WO 2007/098733 | 9/2007 |

OTHER PUBLICATIONS

HouseNeeds.com, "Brazed Plate Heat Exchangers", pp. 1-2, pulled from internet May 13, 2010 (originally pulled from Internet Aug. 13, 2008).

(Continued)

*Primary Examiner* — Alissa Tompkins
*Assistant Examiner* — John Bargero
(74) *Attorney, Agent, or Firm* — Smith, Gambrell & Russell, LLP.

(57) ABSTRACT

A fluid heat exchange system with a fluid flow circuit having a heat exchange fluid flow loop, a heat absorption component (as in a domestic hot water tank inclusive of small commercial use tanks as in tanks of 20 to 120 gallons), a heat exchanger and preferably also a pump. A controlled and automated fuel supply source based heater (as in a pellet stove) is in heat passage communication with the said heat exchanger. A control unit triggers activation of the pump upon fluid in the heat absorption component reaching or dropping below a preset temperature, and the fluid flow circuit is arranged such that, during times of non-activation of the pump, fluid is free to flow in a unidirectional flow within the fluid circuit based on thermodynamic temperature differentials alone. A retrofitting of a domestic hot water tank is also featured preferably making use of preexisting drain and safety vent porting for in-feed and out-feed porting in the exchange loop side. Also, the flow circuit preferably is free of check valves and steam accommodation equipment.

12 Claims, 11 Drawing Sheets

(51) Int. Cl.
*F24B 1/02* (2006.01)
*F24D 3/10* (2006.01)
*F24D 12/02* (2006.01)
*F24D 17/00* (2006.01)
*F24D 19/10* (2006.01)
*F24H 1/20* (2006.01)
*F24H 9/12* (2006.01)
*F28D 9/00* (2006.01)
*F28D 20/00* (2006.01)

(52) U.S. Cl.
CPC ............ *F28D9/005* (2013.01); *F28D 20/0034* (2013.01); *Y02B 30/14* (2013.01); *Y10T 29/49826* (2015.01)

(56) References Cited

U.S. PATENT DOCUMENTS

| | | | |
|---|---|---|---|
| 4,025,043 A | 5/1977 | Cleer, Jr. | |
| 4,046,320 A | 9/1977 | Johnson et al. | |
| 4,139,152 A * | 2/1979 | Kronberger, Jr. | 237/8 R |
| 4,143,816 A | 3/1979 | Skadeland | |
| 4,153,199 A | 5/1979 | Ellmer | |
| 4,180,053 A | 12/1979 | Patel | |
| 4,274,482 A | 6/1981 | Sonoda | |
| 4,309,965 A | 1/1982 | Hill | |
| 4,330,083 A | 5/1982 | Di Fiore | |
| 4,344,411 A * | 8/1982 | Dearborn | 126/34 |
| 4,438,755 A * | 3/1984 | Moffett | 126/34 |
| 4,454,827 A | 6/1984 | Smith et al. | |
| 4,462,542 A | 7/1984 | Person | |
| 4,473,351 A | 9/1984 | Hill | |
| 5,133,266 A | 7/1992 | Cullen | |
| 5,245,984 A | 9/1993 | Longmore et al. | |
| 5,285,738 A | 2/1994 | Cullen | |
| 5,979,782 A | 11/1999 | Elwart | |
| 6,032,868 A * | 3/2000 | DiMarco | 237/8 R |
| 6,161,567 A * | 12/2000 | Ziehm | 137/357 |
| 7,077,155 B2 * | 7/2006 | Giammaria | 137/337 |
| 7,644,686 B2 * | 1/2010 | Threatt et al. | 122/37 |
| 2002/0083944 A1 | 7/2002 | Darbonne | |
| 2003/0226561 A1 | 12/2003 | Darbonne, Sr. | |
| 2007/0137537 A1 * | 6/2007 | Drisdelle et al. | 110/297 |
| 2007/0157858 A1 | 7/2007 | Gagner et al. | |
| 2008/0006227 A1 * | 1/2008 | Ziehm et al. | 122/19.1 |
| 2008/0216770 A1 * | 9/2008 | Humphrey et al. | 122/13.3 |
| 2009/0025654 A1 * | 1/2009 | Hardy | 122/14.1 |
| 2009/0183693 A1 * | 7/2009 | Furman | 122/16.1 |
| 2010/0037888 A1 * | 2/2010 | Gordon et al. | 126/609 |
| 2010/0083952 A1 | 4/2010 | Van Houten | 126/678 |
| 2010/0139579 A1 * | 6/2010 | Su et al. | 122/367.1 |

OTHER PUBLICATIONS

"Pellet Fuel Future of American Energy" published by Pellet Fuels Institute, 4 pgs (no date).
Englandsstoveworks.com "Englander", Pellet Burning Models, 2 pgs, pulled from internet Oct. 23, 2008.
England's Stove Works, Inc., Englandsstoveworks.com, 1 pg., pulled from internet Oct. 23, 2008.
"Pellet Stoves" published by Pellet Fuels Institute, 2 pgs. (no date).
Wikipedia, "Plate heat exchanger", 3pgs, pulled from internet Nov. 14, 2008.
Wikipedia "Pellet stove", 3 pgs., pulled from internet Aug. 5, 2008.
Englanderstoves.com, "Installation & Operation Manual", Model No. 25 PDVC, pp. 1-25, Jan. 2007.
Peterson, et al., "Update on compact composite plate heat exchangers", High-Temperature Heat Exchanger (HTHX) Project, UNLV, (13 pgs.), Dec. 17, 2004.

* cited by examiner

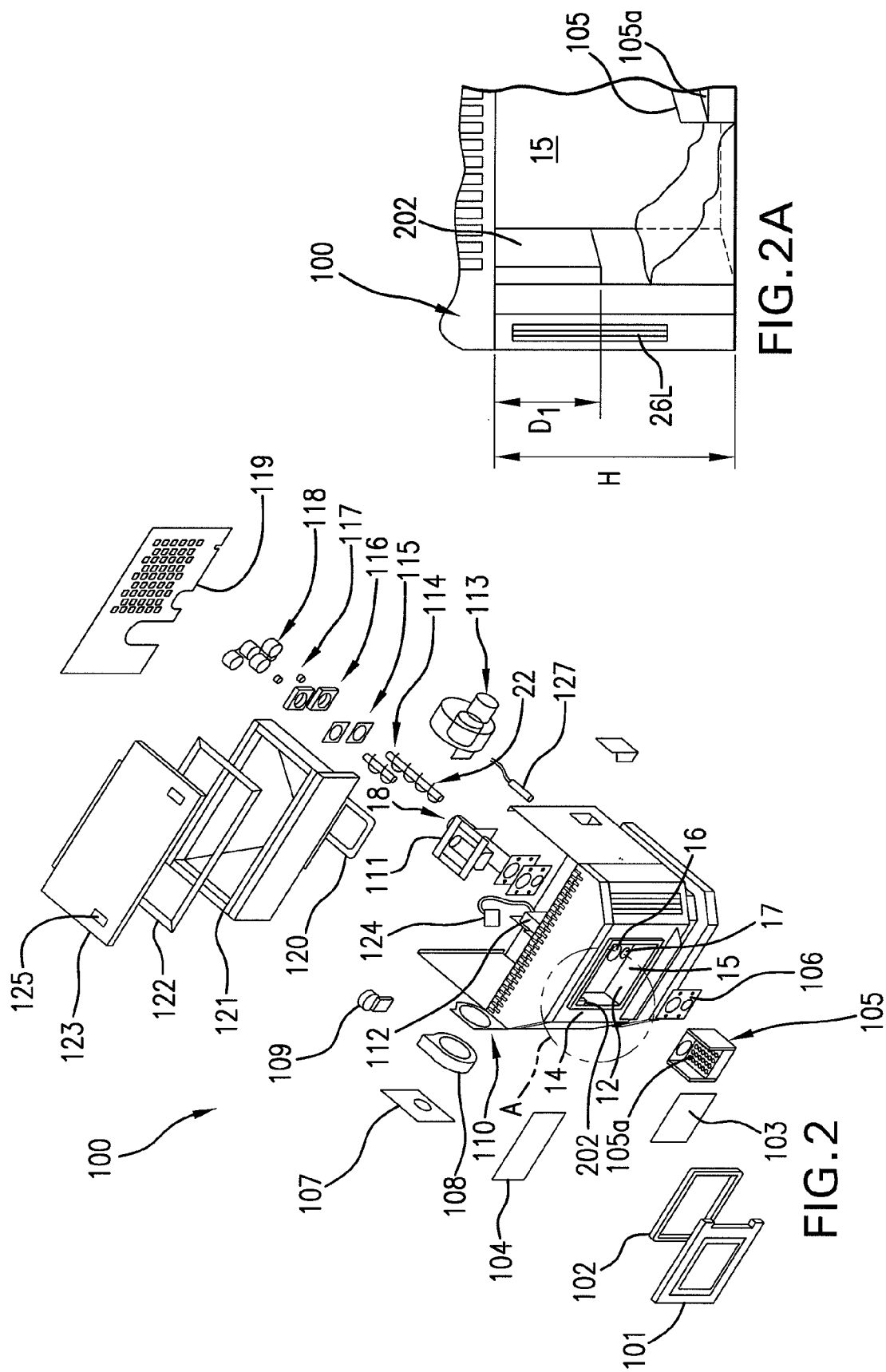

FLUID HEATING SYSTEM

CROSS REFERENCE TO RELATED APPLICATION(S)

This application claims the benefit of U.S. Provisional Application No. 61/202,569, filed Mar. 12, 2009 which application is incorporated herein by reference.

FIELD OF INVENTION EXAMPLE

Subject matter of the present invention is inclusive of a fluid heating system, with a preferred embodiment featuring a fluid heat exchange loop or fluid flow circuit which preferably receives heat from an automated or regulated fuel supplied heat source, as in a pellet stove, and that is designed to transfer heat derived from that heat source to a heat absorption component of the fluid flow circuit which is preferably in the form of a domestic hot water tank.

BACKGROUND OF THE INVENTION

Pellet burning heating devices are known such as those described in the following patent(s) and publications(s):

| | |
|---|---|
| 5,133,266 | Cullen |
| 5,285,738 | Cullen |
| US2003/0226561 | Darbonne, Sr. |
| US2007/0137537 | Drisdelle et al. |
| US2007/0157858 | Gagner et al. |
| WO2007/098733 | Koppe |

Pellet stoves are often installed in residential homes as secondary environmental air heat sources and, in some instances, as a primary environmental air heat source. A pellet stove is an automated burner that burns economical pellets made typically from recycled sawdust and other forms of biomass such as corn. The biomass material (often biomass waste material) is processed into generally consistent sized and geometrically shaped solid units as in pellets. A typical pellet stove has an electro-mechanical, automated fuel feed system which delivers the wood pellets from an integrated feed hopper to a burn chamber. Once pellets are ignited, combustion air is forced through the burning pellets with an electric fan creating a mini-furnace. A typical pellet stove normally consists of a hopper, a screw auger system, a blower system (often a combustion fan, convection fan and an exhaust fan), a firebox (with refractory panels, a burn pot with apertured wear plate), and an operation control system (which, for example, runs the fans, feed auger and monitors for safety issues). Often there is provided a front door (often a glass windowed door) for access (e.g., cleaning ash from the burn pot) and an underlying ash tray. The automated feed and control system is designed to provide for a high degree of combustion of the fuel and relatively consistent heat energy output.

Fluid heat exchange systems are also featured in the art such as those described in the following patent(s) and publication(s):

| | |
|---|---|
| 4,025,043 | Cleer Jr. |
| 4,046,320 | Johnson et al. |
| 4,143,816 | Skadeland |
| 4,153,199 | Ellmer |
| 4,309,965 | Hill |
| 4,330,083 | Di Fiore |
| 4,344,411 | Dearborn |
| 4,438,755 | Mofett |
| 4,454,827 | Smith et al |
| 4,462,542 | Person |
| 4,473,351 | Hill |
| 5,245,984 | Longmore et al |
| 5,979,782 | Elwart |
| US2002/0083944 | Darbonne |

There is lacking in the art a domestic hot water heater system that takes advantage of the characteristics of regulated heat supply heating devices as in a pellet stove relative to a heat absorption component as in a domestic hot water unit (e.g., a 20 to 90 gallon domestic hot water tank) via an efficient circulation loop and flow control system. There is also lacking in the prior art a hot water heater system that provides for rapid retrofitting of a preexisting hot water heater system, without substantial deviation of that system, for use with a pellet stove or the like, as well as increasing the options as to a multitude of different fuel sources for a domestic hot water tank or the like.

SUMMARY OF THE INVENTION

The subject matter of the present invention includes an efficient hot water heater system that has a fluid heat exchange loop that incorporates a pellet stove (or other fairly consistent heat energy output means that preferably utilizes relatively standard sized solid biomass based fuel components as in pellets) and a heat absorption component that is preferably in the form of a domestic hot water unit. The domestic hot water heater system is preferably designed such that it can be rapidly installed and is a system of minimized maintenance concern. Further, an embodiment of the present invention provides a fluid heat exchanger system that preferably makes use of a pellet stove that is incorporated into a fluid heat exchange flow circuit design that can be readily installed relative to a preexisting hot water heating unit.

The fluid heating system is preferably arranged such that the fluid (e.g., domestic use water) is set up in a flow pattern that takes advantage of maintaining a consistent in/out flow pattern through cold/hot water states by way of fluid thermodynamic transfer tendencies preferably in conjunction with a small pump or alternate flow influencing means. In this regard, there is preferably avoided the use of check valves or the like such that there is avoided the formation of locked volumes or blocks of fluid in the heat exchange loop.

Further, an exemplary embodiment of the hot water heater system is set up as to utilize the preexisting drain and emergency release porting and piping of a standard hot water heating unit in integrating the hot water unit into the heat exchange flow circuit. Further this integration is achieved with little deviation in the structure of a standard hot water heating unit. The hot water heating unit is also preferably a domestic hot water heating tank, which tank (e.g., the fluid body within the tank) functions as a component in both the domestic hot water supply circuit and the fluid heat exchanger flow circuit.

An exemplary embodiment of the invention features a pump control electronically integrated with the circuitry that is pre-existing for a domestic hot water heating unit or hot water tank such that it is provided at a common location with the normal temperature setting circuitry or temperature setting means of the domestic hot water heating system (e.g., the pump control circuitry is preferably integrated in with the domestic hot water heating unit's electric circuitry positioned within a recess formed within the surrounding tank insulation and behind a releasable access plate on that tank). In an exemplary embodiment, there is provided pump control circuitry that is temperature based (e.g., thermostat triggering) with the sensing and activation circuitry or means mounted on a common support preferably in the tank's electronics recess as in a common circuit board mounted within said recess.

An embodiment of the invention features a heat exchange system that can be readily retrofitted to a variety of pellet stove designs and makes for an efficient fluid heating system. For example, embodiments of the invention feature heat exchanger embodiments dimensioned for insertion in an automated solid fuel burning heater (e.g., a pellet stove) for heat transfer from the heater to the fluid circuit. An example is seen in having a pellet stove in which is mounted and strategically supported a heat exchanger (e.g., a heat exchanger mounted at a location that takes advantage of the heat output of the wood stove and of a design that preferably avoids any substantive steam generation in the fluid flow circuit by way of the thermal transfer flow freedom in the fluid circuit).

A variety of different types of heat exchange devices or heat exchange means can be utilized including those comprising a heat exchanger that is mounted either flush or in spaced parallel fashion along a wall of the heater (e.g., a refractory wall of the pellet stove's fire box). A preferred embodiment has the heat exchanger mounted for direct heat access relative to the combustion chamber of the heater as in mounting the exchanger to a wall of the combustion chamber of, for example, a pellet stove within which is typically placed a burning pot. A wall flush mount or a cantilever extension mount is preferred. Also, the heat exchanger is preferably positioned as to avoid contact with built up ash (e.g., an upper 50% height location heat exchanging mount arrangement or limit within the combustion chamber is well suited for avoidance of fly ash contact and the undesirable insulation effect posed by such fly ash build up about the exchanger). A preferred embodiment places the heat exchanger to one of the left or right sidewalls of the combustion chamber sidewalls, although alternate positions as in along an upper wall or even external to the combustion firebox as in flush to a wall surface that is one chamber away from the firebox chamber.

An exemplary embodiment of the invention features providing (e.g., cutting) two pipe communication apertures into a wall of a pellet stove (e.g., one of the side walls) and mounting a heat exchanger with proper mounting means (e.g., a compression flanged nut combination) such that the heat exchanger can be mounted in direct of flush contact with a wall of the heater; or the heat exchanger can be suspended by way of, for example, a cantilever support (e.g., extended "stub" piping) into a more interior region of the stove's combustion chamber (e.g., less than a six inch as in a two to three inch cantilever extension from the supporting wall panel of the pellet stove). Providing a heat exchanger in the stove can further include, in an alternate embodiment, a pre-designing of a heat exchanger with an integrated stove wall panel (e.g., a pre-fit pipe connection for a downstream assembly by a purchaser) or a manufacturer integrated heat exchanger as in an integrated fire box chamber wall heat exchanger with fluid porting that replaces a preexisting wall panel of the pellet stove without the need for cutting or otherwise fully retrofitting a pre-existing heating device's wall panel (a compression nut mounted heat exchanger with in/out porting).

An embodiment of the invention includes reliance on the heat exchanger circuit as the sole heat source for the fluid in the hot water tank (e.g., sole use full time or for designated time periods as in seasonal use such as full time all winter). This can provide for, in exemplary embodiments, the non use of other potential heat supply sources as in the standard hot water tank heat source(s) as in an electric resistance coil or natural gas, and/or an oil or gas fuel based boiler as in one for base board radiant heating units. Thus, for example, in such three way potential fuel type heat supply systems (pellet stove heat exchange loop, standard hot water tank heater and system oil or gas burner (e.g., base board heating)) one or two of such heat sources can be completely not utilized for any domestic hot water heating with reliance placed solely on only one as in reliance solely on a pellet stove based heat exchange loop (e.g., reliance solely on the pellet stove heat exchange loop for all domestic hot water heating such as during the cooler or colder months, with reliance on, for example, electric hot water resistance coils in the warmer (e.g., summer months when the pellet stove is not typically utilized)).

Also, the fluid heating system of the present invention in an embodiment uses the heat exchange circuit to supplement a preexisting or standard heater element(s) for a domestic hot water heating unit as to avoid or minimize the energy usage of the pre-existing or standard heater element(s). For example, the standard heater element(s) and/or a separate oil or gas based boiler heater exchange system, if present, can be used to provide backup heat energy in the event of non-functioning of the heat exchanger means of the present invention or is used as a contemporary supplement to the heat exchanger means (e.g., a control system using a hybrid heat arrangement). Contemporary usage of one or more of pre-existing or standard domestic hot water tank heating units can also be helpful, for example, in situations where the hot water tank is of larger capacity (e.g., greater than 70 gallon as in about 90 gallon size). Preferably the hot water tank is set up to provide direct-to-user heated water (and thus preferably not as a large storage capacity tank to feed into a domestic hot water tank, although alternate embodiments feature such an "intermediary" fluid heat exchange tank for use with a standard domestic hot water tank). Also, preferably both the standard heating element(s) and heat exchange loop involve heating domestic water running through the domestic hot water tank as a portion of the overall heat exchange loop. That is, the hot water tank functions as part of each of the domestic hot water supply circuit and the heater (e.g., pellet stove) based heat exchange loop, with preferably a direct intermingling of potable water in the tank for usage by the respective fluid flow circuits.

In an embodiment of the invention the fluid heat exchange circuit is set up to naturally avoid steam generation—as in natural passage of warmer or heated water to cooler water zones with a pump being preferably provided to facilitate operational control of fluid flow in the fluid circuit. Hence, with this embodiment there is avoided the need for steam accommodation equipment in the fluid flow circuit.

In an embodiment of the invention the flow circuit is set up to avoid the presence of check valves and the like relative to the flow of fluid through the system as there is featured a one way arrangement flow which avoids the concern for reverse flow in the system (again the flow circuit is set up such that advantage is taken of the hot-cold fluid thermodynamics to facilitate a unidirectional domestic hot water flow travel direction without the need for check-valves).

BRIEF DESCRIPTION OF THE DRAWINGS

FIG. 2 shows an exploded view of that which is shown in FIG. 1.

FIG. 2A shows an enlarged view of the circled region of FIG. 2 including a mounted heat exchanger.

DETAILED DESCRIPTION OF EMBODIMENTS OF THE INVENTION

Figure 1:
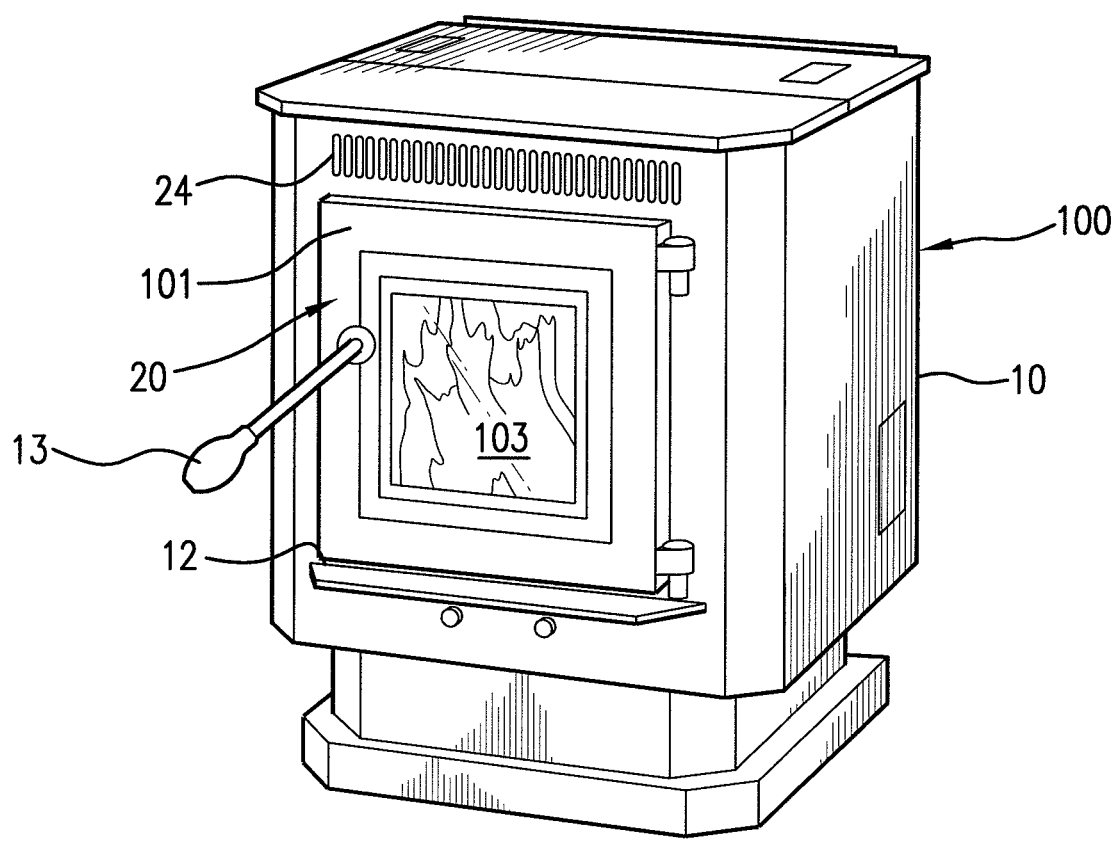
FIG. 1 shows a perspective view of a pellet stove that has been modified to include a heat exchanger in accordance with an exemplary embodiment of the invention.

FIG. 1 shows a perspective view of heater device 100, which is preferably in the form of a pellet stove providing heat supply means in an embodiment of the present invention. Heat supply means 100 provides a source of heat energy to the below described fluid flow heat exchange circuit 200 (see FIG. 5). The combination of heat supply means 100 and fluid flow circuit 200 provides fluid heating system 300. While a variety of heat supply means 100 can be utilized in embodiments of the fluid heating system 300 of the present invention, a heat supply means that features an automated and controllable supply of relatively consistent geometrically shaped solid biomass fuel units to a burner location such as a pellet stove is preferred. Also, the solid fuel is preferably of a relatively consistent constitution in the material forming those fuel units as in processed sawdust or other waste material biomass (e.g., consistency from pellet-to-pellet of either a relatively unitary type of source material or a mix of source materials). Suitable unit (e.g., pellet) material sources include, for example, saw dusts and other wood processing waste or other pellet source wood products, fruit pits, corn, peanut shells and other natural or agricultural products or additional types of bio-mass as in bio-mass waste material or mixtures thereof.

Pellet stove 100 is an example of a heater device that features a controlled supply of relatively consistent shaped solid fuel units preferably in pellet form (e.g., small generally cylindrical shaped fuel components or other relatively consistent shaped fuel components including spherical and other geometrical shapes). Also, a preferred pellet stove heating unit under the present invention preferably has an efficiency rating of 75 to 90% or more and a heat output range of 30,000 BTU or higher (e.g., 40,000 BTU).

A consistent fuel source material facilitates maintenance of a generally desired temperature which is maintained with a fairly consistent feed of fuel to the burner of the heater device 100.

With reference to FIGS. 1 and 2 there is seen pellet stove 100 having main housing 10 with an access aperture 12 that is shown covered over by hinged door assembly 20 comprised of door frame 101, handle 13, door gasket 102 (suited for handling the high temperatures associated with pellet stoves as in, for example, 400 to 650° F.) and glass face plate 103 with peripheral gasket 102. Behind door assembly 20, and defined by combustion chamber frame structure 14, there is provided combustion chamber or fire box 15 in which is positioned burn pot 105 with wear plate 105a which rests inside burn pot 105 and is contoured to the shape of the burn pot. There is further provided burn pot gasket 106 for flush mounting of the burn pot to the back wall of the fire box shown as having hopper feed aperture 16 and combustion air input port 17 as well as an impingement plate 104. The system of the present invention is further suited for a variety of forms of pellet stoves with FIG. 1 providing one example.

FIG. 2 further illustrates air access side panel 107 (that side not shown in the FIG. 1 perspective view) as well as side combustion blower 108, downsizing blower adaptor 109 (e.g., a 3 inch blower adaptor) and gasket 110, which blower 108 provides a means for feeding combustion air to the combustion site at the burn pot. There is further featured louvers 26L for further air flow control.

The controlled and automated solid fuel supply means 18 is shown in the illustrated embodiment as comprising pellet feeder pot 111 and auger assembly 22 comprising auger screw assembly 114 (which in this embodiment features a back burn avoidance (avoids fuel hopper ignition) dual above/below auger screw and casing system mounted to the rear side of the above noted fire box back wall at one end). Auger assembly 22 further comprises block bearing gaskets 115, block bearings 116 and shaft collars 117 as well respective auger motors 118.

To close off the back wall of main housing there is provided apertured rear access panel 119. Positioned above pellet feeder pot 111 there is provided hopper flange gasket 120 upon which rests hopper 121 having an upper periphery upon which is provided hopper lid gasket 122 which seals off the hopper chamber upon hopper lid 123 being latched with hopper lid latches 125. Hopper 121 is preferably sized to provide a sufficient fuel component supply (e.g., pellet fuel) to burn pot 15 for maintaining a desired burn level state preferably for at least 24 hours. Also, in exemplary embodiments the fuel supply is preferably premium or standard grade generating cylindrical wood pellets—with the difference between the two being their respective percentage of inorganic ash content versus organic material burned off content), although smaller and larger volume hopper sizes (e.g., longer and shorter hour burn feed length providers) are also featured under the present invention.

There is further featured in the embodiment illustrated convection blower 113 which works in conjunction with, for example, front flow ports 24 (FIG. 1) for convection of heated air away from the main housing 10 to complement the radiant heat generation. There is also shown vacuum shut down switch(es) 124 which provide an added level of safety to avoid an overheating or overburn situation. Controller 112, which is preferably in the form of a digital control board for controlling the timing and operation characteristics of, for example, the auger feed flow, the fan flow, and the sensor monitoring for providing a clean burn and maximized energy output from the fuel supplied as well as a sufficient solid fuel flow rate or schedule and to maintain an operator set desired temperature setting or temperature range setting. In the embodiment illustrated there is also shown cartridge heater or igniter 127 which is helpful in an initial burn start relative to pellets first provided to the burn pot.

FIG. 2A provides an enlarged view of the section of the stove 100 generally represented by circle A in FIG. 2. FIG. 2A has hinged door assembly 20 removed for a better view of combustion chamber 15.

FIGS. 2 and 2A show pellet stove 100 together with heat exchanger 202 (forming a portion of fluid flow circuit 200). Heat exchanger 202 in the illustrated embodiment is shown as being mounted to left side wall 26 of combustion chamber frame structure 14 although other positions are featured under the present invention which are preferably positions that do not conflict with other working components of the pellet stove such as the auger feed and fan operation and with a direct combustion chamber mounting preferred for most embodiments.

Figure 7:
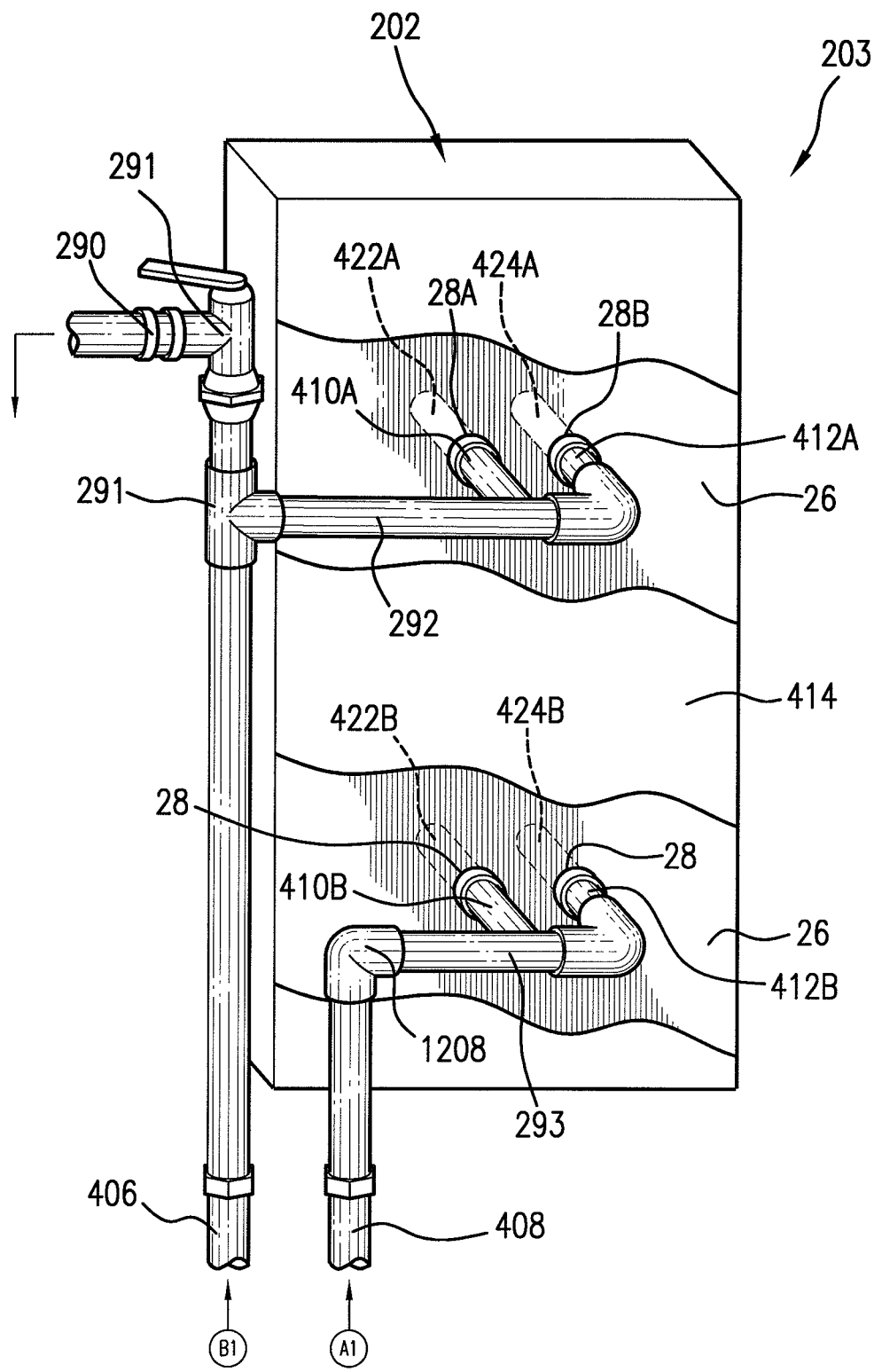
FIG. 7 shows a cut-away, more detailed embodiment partial view of an additional portion of the flow circuit shown in FIG. 5.
Figure 9:
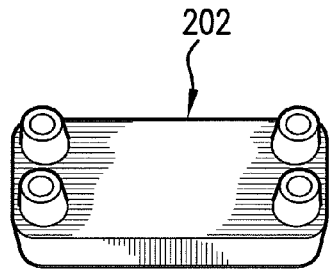
FIG. 9 shows a conventional first type heat exchanger suited for use in an embodiment of the present invention.

The positioning of the heat exchanger 202 is also preferably set up relative to the fire box or combustion chamber 15 as to be close (e.g., in direct contact with the heat output from the burner pot or at least within one or two chambers away from the firebox). For example, while less preferred under most uses of the invention, alternate positions include placement of heat exchanger 202 at a location in a separate chamber directly adjacent the fire box chamber or within a convection flow passageway associated with the combustion chamber. Variations in positioning of heat exchanger 202 to suit the heater's set up can also be facilitated by the type of heat exchanger shape. For example, with reference to FIG. 9 there is illustrated a dual pair inlet and outlet flat plate heat exchanger 202 which is well suited for a flush or cantilever mounting relative to a large wall plate of the heater device 100 such as shown in FIG. 2A, while in FIG. 10 there is shown a single inlet and outlet flat plate heat exchanger 202' (FIG. 10) which in addition to the heater in FIG. 2A is well suited for similar mounting as in the heater 202 mounting, but takes up a smaller footprint with only one inlet and outlet rather than two pairs of the same. A dual inlet outlet flat plate heat exchanger 202 of FIG. 9 is shown as the heat exchanger in FIG. 2 and in greater detail in FIG. 7. FIG. 7 also illustrates apertures 28 being formed in side wall 26 to accommodate the flow through conduits leading into and out of heat exchanger 202 and into fluid communication with the another part of the below described fluid flow circuit 200.

Figure 11:
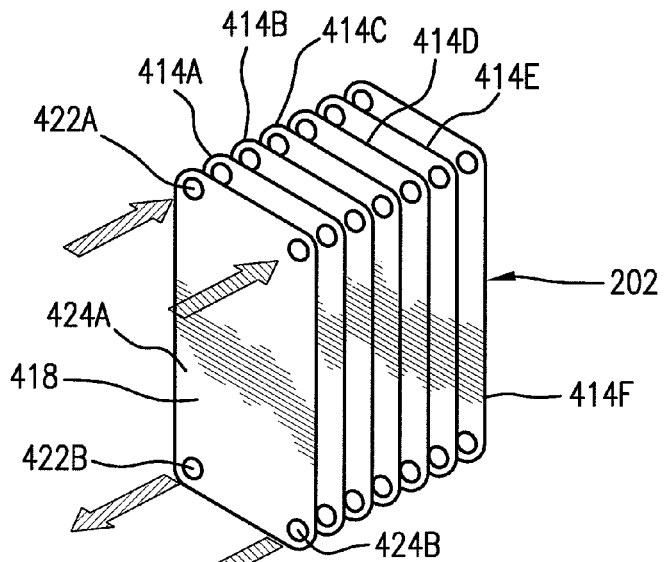
FIG. 11 shows a schematic view of the first type flat plate sheet exchanger of FIG. 9.
Figure 12:
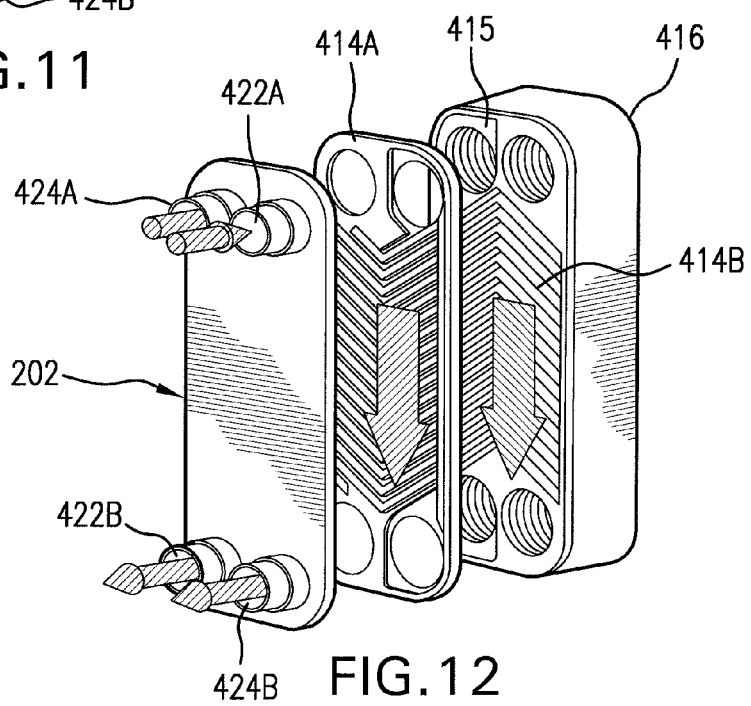
FIG. 12 shows a partially exploded view of the first type flat plate heat exchanger of FIG. 9.

FIGS. 11 and 12 provide a schematic and partially exploded views of heat exchanger 202 for the heat exchanger shown as provided in flow circuit 200, which heat exchanger features a stack of flat plates having channel passages for the flow of domestic hot water safely. Thus, FIGS. 11 and 12 illustrate the potential for the heat exchanger of the flow circuit 200 to have a variety of potential configurations for the domestic cold water inlet flow to pick up the heat generated by heater device 100 before passing to hot water heating device 204 (FIGS. 5 and 6)). The dual port sets flow arrangement of FIGS. 6 and 7 is an exemplary embodiment that provides for piping simplicity as illustrated by the condensed parallel in-feed and out-feed water input/out-feed lines 406 (in-feed) and 408 (out-feed) with the respective branch extensions 410A, 410B and 412A and 412B which provide a greater surface area spread relative to main-housing 414 of heat exchanger 202 while providing for ready attachment to a wall panel of the heater device 100.

Figure 10:
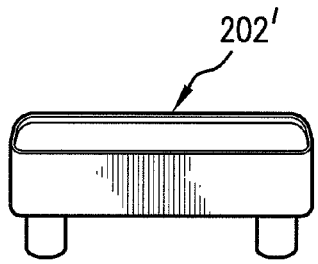
FIG. 10 shows a conventional second type heat exchanger suited for use in an embodiment the present invention.

FIGS. 11 and 12 provide an illustration of the stacking arrangement found in flat plate heat exchangers such as those shown in 202 and 202' of FIGS. 9 and 10 (e.g., brazed flat plate heat exchanger stack suited for isolating a hydronic heating circuit). As seen from FIGS. 11 and 12, the heat exchanger 202, as an example of a heat exchange embodiment, is comprised of a plurality of interior exchanger plates 414A to 414E (just an illustrative number of plates that can be stacked as lesser and more of the plates can be stacked). Alternate heat exchangers or heat exchanger means are also featured under the present invention including encased coiled piping and other heat exchange transport means. In the embodiment of heat exchanger 202 shown there is featured an exterior main body housing 416 with a recess 415 to receive the plate stack as well as a cover plate 418 which together form the interior flow cavity. Further provided are inlet and outlet port sets 422A, 424A and 424A, 422B, respectively.

As noted above, alternate heat exchanger means are featured under the present invention including heat exchanger means for achieving a heat to water transfer in the stove include, for example, a U-shaped pipe (e.g., a ¾" stainless steel pipe threaded on both ends), a coiled device as in a coil of copper tubing, or alternatively a finned U-shaped tube as in a finned copper U shaped tube as a few examples.

Figure 6:
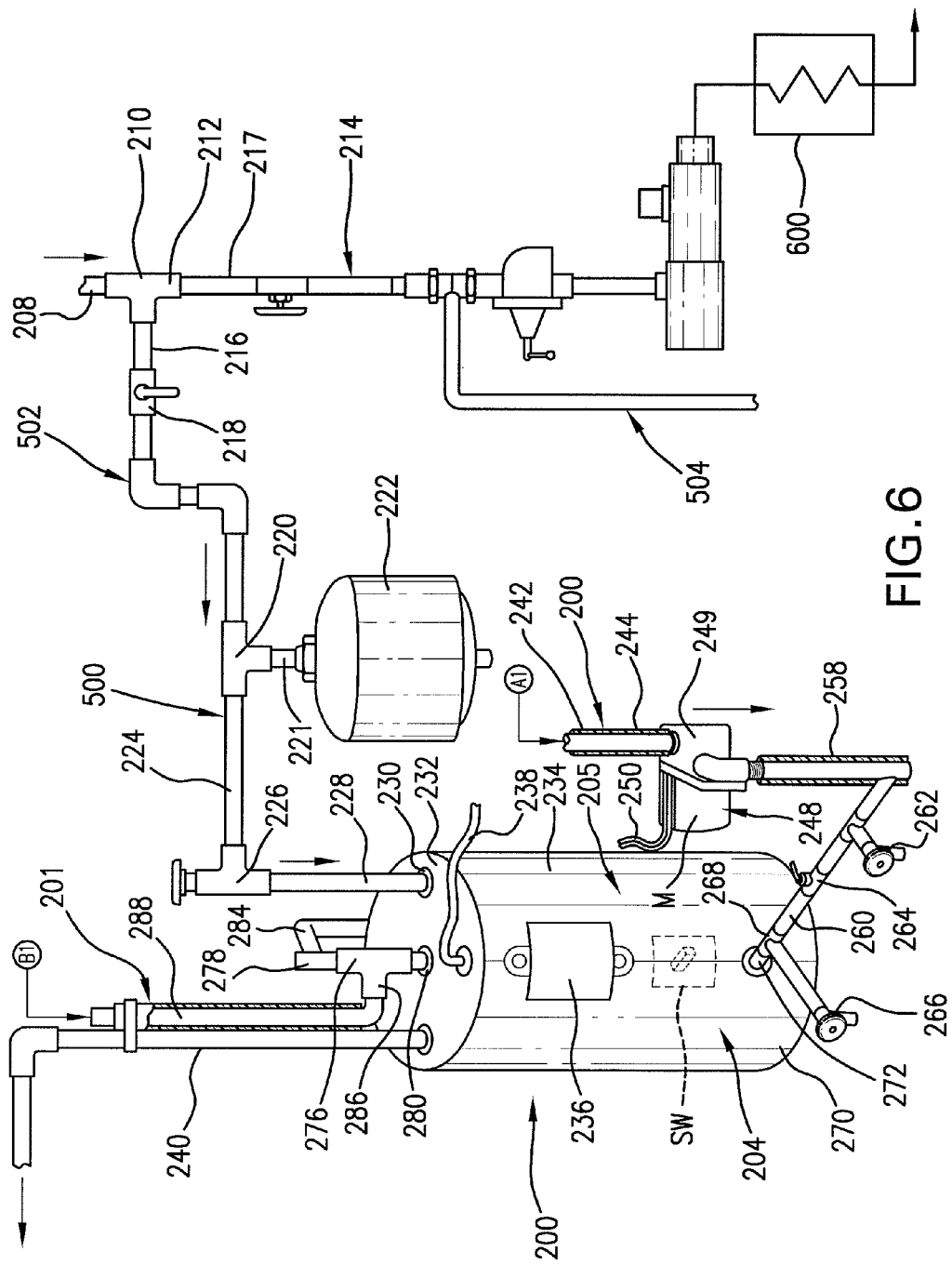
FIG. 6 shows a partial, more detailed embodiment view of a portion of the flow circuit shown in FIG. 5 together with a portion of a boiler heat exchange loop.

FIG. 6 shows a cut-away partial view of a portion 201 of fluid flow circuit 200 which includes hot water heating device 204, which, in a preferred embodiment, comprises a domestic hot water heater device. In the embodiment illustrated there is featured a standard 40 gallon hot water tank 204 with one or more internal electric heating elements (e.g., a pair of standard electric heat resistance loop elements) as described in greater detail below. Hot water heating device 204 can take on a variety of alternate forms including larger or smaller size tank sizes as in a 20 to 90 gallon tank range capacity as a few illustrations of a capacity range well suited for use in the present invention, but not intended to be limiting.

Also, rather than an electric heat resistance based hot water heater device 204, a variety of alternate domestic hot water heater devices can be provided as hot water heating device 204, such as a natural gas or oil burner source based hot water heater device. Further, it is preferable to have an internal or integrated hot water tank heat source or sources (e.g., maintaining a standard hot water tank heat source as in one that is included upon purchase) as in the above-described electric resistance heater coils or natural gas burner conduit. Under an alternate embodiment, however, there can be relied upon only the below described heat exchanger 202 in fluid flow circuit 200 to provide the desired level of domestic hot water usage (e.g., where the usage of a pellet stove will be consistent and sufficient as to provide the only heat source of the fluid in the tank 204). This arrangement is suited for geographical areas where the temperature is low for much if not all of the year and indoor stove operation is favored. The size of the tank may also enhance the potential for heat exchanger only hot water tank heating (e.g., the 20 to 30 gallon tank ranges being better suited than a 70 to 90 gallon tank size). Further, heat sources used to supplement heat exchanger 202 are inclusive of other external types as in solar based (alone with heat exchanger 202 or in combination with other heat exchangers or in combination with the standard source as in an electric resistance based hot water heater).

Figure 5:
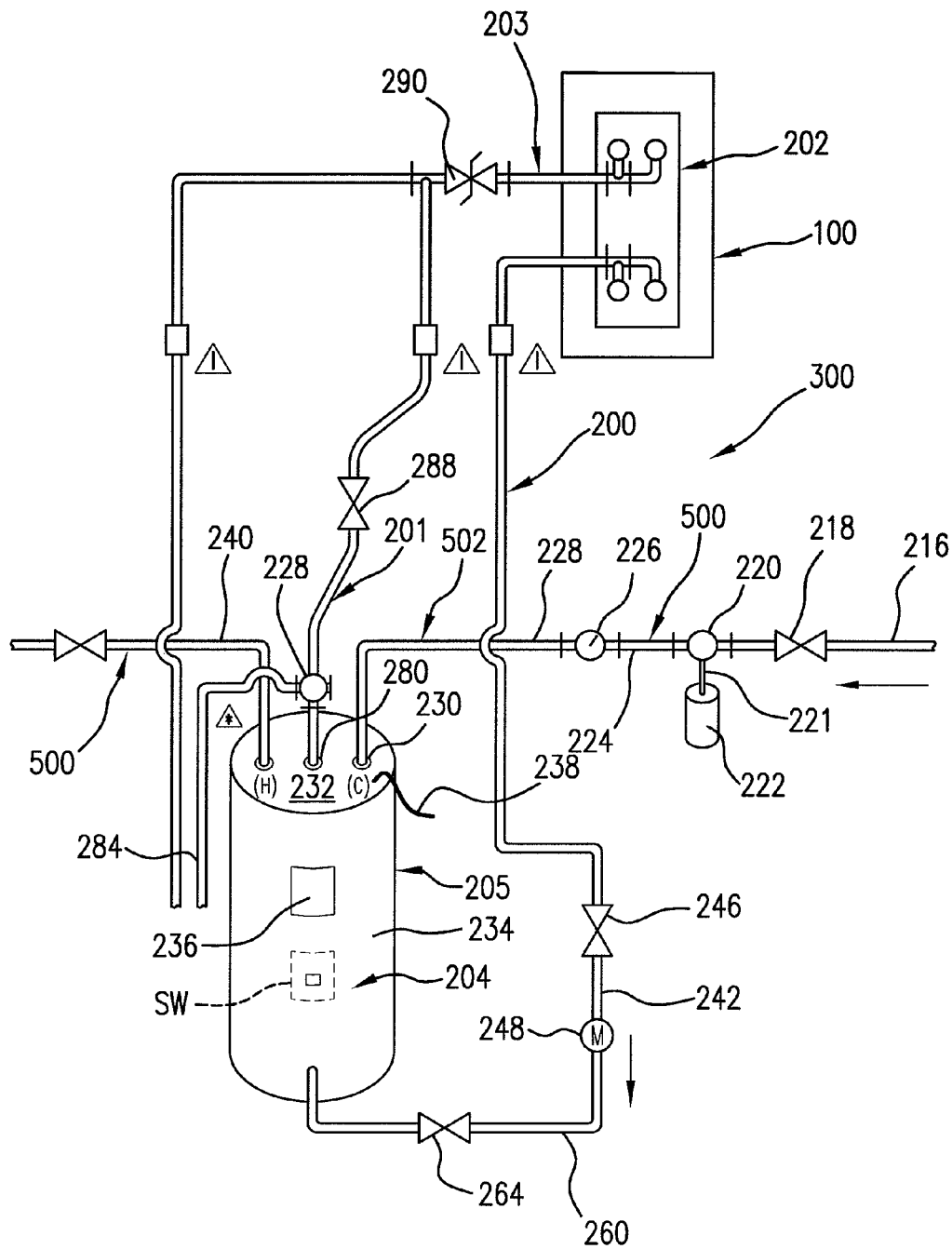
FIG. 5 shows a schematic flow circuit view of an embodiment of the present invention.

With further reference to FIGS. 5 and 6, there is illustrated fluid heating system 300 comprised of heater device 100 (shown schematically in FIG. 5), fluid flow heat exchange circuit 200 and domestic water supply flow circuit 500. As shown, fluid flow heat exchange circuit 200 is designed to interface with domestic water supply flow circuit 500 at a common interface of hot water heating device 204 with hot water storage tank 205.

In FIGS. 5 and 6, only a portion of the entire domestic water supply flow circuit 500 is shown as emphasis is made relative to the domestic hot water supply portion 502 of the entire circuit 500 (with branch segment circuit portion 504 illustrating the portion that runs to, for example, the other cold water supply regions of domestic circuit 500 (e.g., cold water taps)).

As seen from FIGS. 5 and 6 there is shown domestic water inlet line 208 which is shown feeding to a T-branch segment 210 having a first branch 212 feeding to a first domestic cold water supply section 214 which feeds to, in this illustrated embodiment, an oil burner with boiler 600 (shown schematically in FIG. 6) heat exchange system. A second branch 216 is shown extending toward hot water heater device 204 (as a "cold" water source for hot water tank 205). FIGS. 5 and 6 further illustrate cut off valve 218 leading to second T-branch 220 from which extends line 221 feeding into expansion tank 222 which provides for absorption of inlet line pressure differentials. Domestic cold water supply line section 224 extends downstream from expansion tank 222. Line section 224 leads to vacuum break 226. As shown in FIGS. 5 and 6 there is also a further downstream line section 228 which extends to inlet port 230 provided in hot water tank 205. In the illustrated embodiment line section 228 is a vertical section that extends to inlet port 230 formed in the top cover 232 of tank 205. Tank 205 further includes main body 234 (e.g., a cylindrical tank wall) in which it provides a recessed cavity covered by access cover 236. In this embodiment, hot water heating device 204 further includes an electric cable or electric energy supply line 238 also shown as gaining access to tank 205 via a hole in cover 232. Electricity supply device 238 feeds a standard electric heat resistance pair of elements (see FIG. 13) which extend into the hollow, water reception interior of tank 205. These electronic heat resistance elements are set to a desired heating temperature level via an electric temperature control board positioned behind access cover 236 (e.g., a pair of temperature setting dials which, respectively, control independent resistance heat elements such as those described below for a conventional electric resistance element based hot water tank or a single dial for use with, a single element or a single temperature set oil or gas burner based domestic hot water tank system).

FIGS. 5 and 6 further illustrate the domestic hot water feed line 240 extending vertically off from top cover 232 of the heating device 204 and through which heated water flows to the domestic hot water supply circuit's output locations (e.g., showers, washing machines, dishwashers, hot water taps, etc.—not shown).

Figure 13:
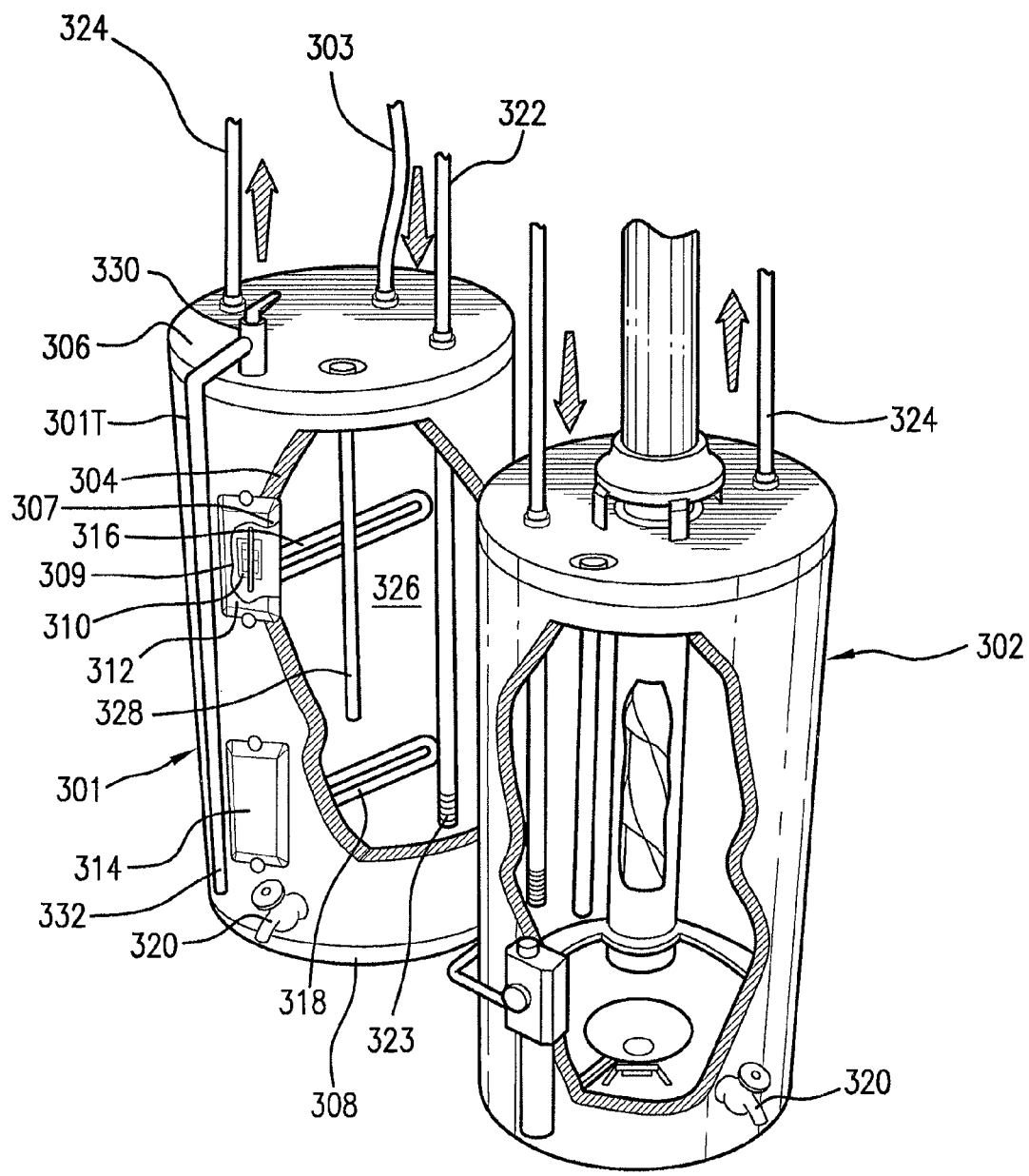
FIG. 13 shows a side-by-side view of first and second embodiments of conventional domestic hot water heaters.

Reference is made to FIG. 13 which show a pair of conventional tank-type water heaters, with the left view showing a conventional electric water heater 301 and the right side view showing an oil or natural gas-fired water heater 302. These views are provided to better appreciate the modifications described below (e.g., a retrofit) which represents an exemplary embodiment of the present invention. As seen in FIG. 13, conventional water heater 301 comprises an insulated, cylindrical shell 304 with a top cap 306 and a base 308. Conventional water heater 301 further includes a power source 303 (220 volt featured) extending into top cap 306 and in communication with upper thermostat assembly 307 with thermostat 309 and associated circuitry 310 and access cover 312. In the embodiment illustrated there is provided two resistance coils and a heat similar thermostat assembly 314 is provided at the lower positioned resistance loop (with other conventional hot water device having a single location dual dial temperature adjustment circuit) to provide standard resistance heating source 316 (and/or 318) adjustment.

FIG. 13 further shows the coil heat resistance upper and lower thermostat assemblies 307 and 314 respectively being behind access covers. FIG. 13 also shows a bottom positioned drain cock 320 positioned just above base 308. Cold water inlet pipe 322 and hot water outlet pipe 324 also extend through top cover 306 and into the interior 326 of tank 301T of water heater 301. The cut-away also illustrates cold water inlet pipe 322 including dip tube 323 that extends into the lower quarter region of tank 301T. Also, extending into the lower half of cavity 326 is anode 328 (to help avoid corrosion relative to, for example, chemicals (e.g., salts) in the water in the tank 301). There is also shown "T&P" valve (temperature and pressure) relief valve 330 mounted on cover 306 and extending with its relief pipe 332 along the exterior of tank 304 toward the lower quarter of the height of cylindrical shell 304.

With reference back to FIGS. 1A, 5, 6 and 7, there is provided further detail of fluid flow heat exchange circuit 200 ("exchange flow circuit") with a full loop view provided schematically in FIG. 5 and a cut-away view provided in each of FIGS. 6 and 7 with FIG. 6 providing a tank side section 201 of exchange flow circuit 200 with hot water tank 204 forming a portion thereof and FIGS. 7 (and 1A) providing a heater device side circuit section 203 with heat exchanger 202 forming a portion thereof.

FIG. 6 illustrates tank side circuit section 201 of exchange flow circuit 200 and there is shown feed line section 242 which is shown in cut-away and with insulation wrapping 244. FIG. 5 further illustrates feed line section 242 as extending from the output side of heat exchanger 202 following a pick up heat energy derived from heater device 100 (e.g., a pellet stove in operation). There is further shown in FIG. 5 a cut-off valve 246 which is preferably similar to valve 218 for line 216 (FIG. 6), and which is well suited for cutting off water supply for servicing (e.g., servicing of the below-described pump following a shutting off of pump switch SW (FIG. 5) as well preferably provided as a component in the circuitry of the heating system).

Figure 1A:
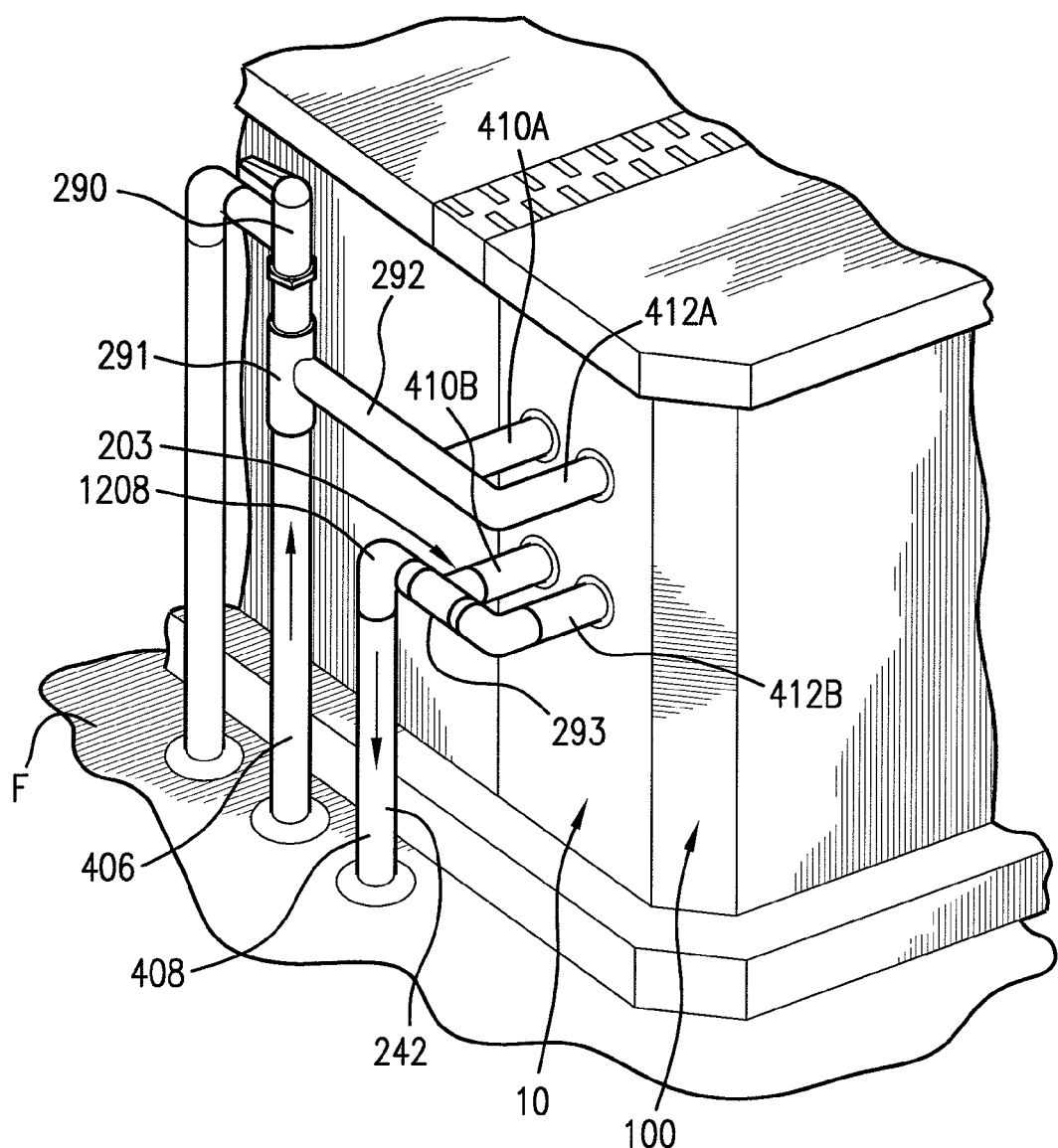
FIG. 1A shows a cut-away view showing the left side perspective of that which is shown in FIG. 1.

FIG. 1A illustrates heater device side circuit section 203 in relationship with housing 10 of pellet stove 100. In the illustrated embodiment, the in-feed and out-feed lines 406 and 408 are shown extending through floor F. That is, the illustrated embodiment includes a pellet stove 100 provided in an upper floor (e.g., a living room) with a gravity assisted feed to a hot water tank positioned generally therebelow in a lower floor as in a basement. Various other embodiments are also featured as in-same floor, an opposite above/below relationship, exterior location to interior location, etc.

As seen from FIGS. 5 and 6, feed line section 242 feeds into an upstream side of pump 248 which is suited for domestic-water passage (water remains potable for domestic use after passing through the pump) (e.g., a TACO 1/40 HP, 120V bronze continuous duty pump TACO Inc of Cranston R.I.). Pump 248 comprises motor M and a suitable fluid flow promoting section 249 (e.g., impeller, gerotor, diaphragm, or other fluid pumping means). There is further featured electric connection line 250 which is in communication with hot water (T-stat) electric line on/off switching circuit 252 shown in FIG. 8 as well as in an on/off pump switch line with manual switch SW.

Figure 8:
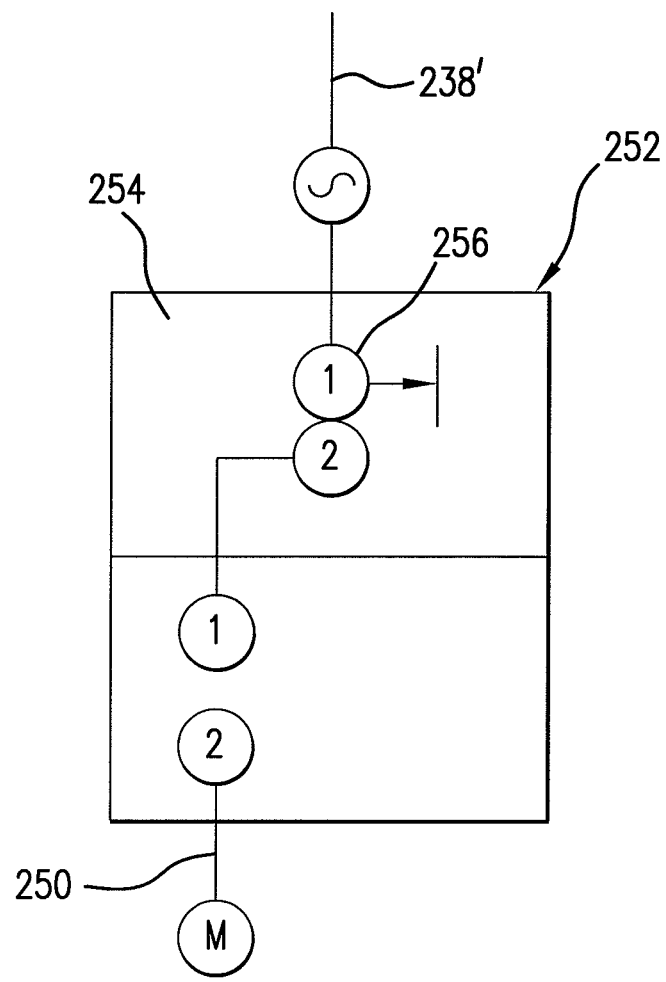
FIG. 8 shows a schematic view of electric circuitry utilized in fluid flow control in the fluid flow circuitry.

As shown in FIG. 8, there is featured in-feed electrical supply wire 238' (e.g., a 120 volt electrical feed line from the domestic electrical supply box) which is or forms part of electrical supply cable 238. There is further shown in FIG. 8 a high temperature thermostat limit assembly 254 forming part of temperature status switch assembly 252. T-stat 254 is set at a desired temperature "$T_1$" preferably fully within typical domestic hot water temperature settings as in 90° to 150° F. In a exemplary embodiment $T_1$ is set at 125°±5°. In the T-stat assembly 254 the temperature of the water in the tank is sensed as with the standard temperature monitoring means associated with domestic hot water tanks (e.g., a thermocouple in direct contact with the tank water). When the sensed temperature is below $T_1$ the T-stat contact 256 is closed (or placed in a heat exchange loop flow as in a pump run mode) such that pump 248 runs to circulate water through both heat exchanger 202 (preferably located inside the stove's 100 firebox) and hot water tank 205. In other words, when temperature sensing means detects a drop in temperature of the fluid in the tank 205, the pump is activated to initiate a pump driven flow in the heater device side circuit section 203. Switch SW also provides a direct shut off mode as when non-use of the heater is anticipated.

When the sensed hot water in tank 205 (or some alternate hot water temperature sensor location) reaches $T_1$ (e.g., 125° F.) the T-stat contact 256 opens and the pump shuts off. Thermal dynamics dictates that hot water will flow toward the cooler ("cold") water thereby, under a preferred embodiment, hot water in the flow circuit 200 will flow toward cold water in the system thereby preventing water in the heat exchanger or conduits (e.g., copper tubing) near the stove 100 from going to steam. Thus, there can be a heat exchange flow circuit free of any check valves through the whole loop. The relative positioning of the heat exchanger within the heater device 100 also plays a role in maintaining the fluid passing in the heat exchanger and the locations just downstream thereof from converting from a liquid to a steam state. In the event, however, there is a non-designed pressure increase in the heat exchange circuit 700, there is included relief valve 290 (FIG. 1A) which, in the illustrated embodiment features a dump line extending below floor F (e.g., into a basement or externally of a housing structure).

As noted above, the flow circuit 200 arrangement of a preferred embodiment also is free of check valves or alternate backflow preventers. There is also shown in the illustrated embodiment a heat exchange loop with strategically positioned conduit positioning to help the water gravity provide the desired feedback of the water to the hot water tank 205 while avoiding any check valves or the like. Further, pump 248 is preferably designed as to allow or not preclude the natural thermodynamic flow past the pump as the hot source fluid exiting the pellet stove passes to the hot water tank when the sensed temperature of the water in the hot water tank is below a level which is set to trigger pump activation.

In this regard, reference is made to FIG. 6 which illustrates a portion of tank side section 201 with the schematic in line depiction "A1" showing line section 242 extending with more of a vertical slope than a horizontal slope and preferably vertically (and more preferably a true vertical arrangement in the pump region as in one where the line section 242 that feeds into pump 249 extends parallel with the tank 205 side wall and preferably also runs parallel to the domestic cold flow inlet line section 228 as in an arrangement where the line section runs vertically into the top cover 232 of the tank 205).

Water exiting pump 249 extends to pump out-flow line section 258 (also shown in its preferred vertical orientation) with further tank in-feed line section 260 shown as preferably having a horizontal orientation in passing to its flow connection with tank 205. Line section 260 includes hand valve 262 as well as cut-off or flow control valve 264.

The latter is useful when used in conjunction with cut-off valve 246 (FIG. 5) for facilitating pump servicing. As further illustrated in FIG. 6, there is featured a standard hand flow spigot 266; but, as seen, spigot 266 is reoriented (e.g., as part of a retrofitting process or in the initial manufacturing process) as an off-branch component of T-branch segment 268. Further, drain spigot 262 provides a redundant drain location relative to spigot 266 and alternate embodiments include just the use of spigot 266 or just the use of drain off hand valve 262 as well as variations thereof. Also, as shown in FIG. 6, as part of the electrical feed line 250 circulating there is preferably provided an on/off pump switch SW which provides for pump servicing (and can provide a seasonal shut down for avoiding circulation past a cold heat source 100).

The above-described reorientation or rearrangement of lines to and from tank 205 thus provides for a direct fluid flow exchange with feed line section 260 feeding into the base region 270 of tank 205 (e.g., the lower 10 to 20%—preferably within the lower 5% of tank height). With this embodiment, there is still provided a tank drain spigot function via spigot 266 and/or valve 262 (with closing off of the feed line 260 via shut-off valve 264 if fluid is present there). This arrangement also provides a ready retrofit step in that the in-feed line can be utilized with a standard design hot water tank. It is also noted that the in-feed in the base region, at tank inlet port 272 provides for immediate hot-water/cold-water contact as the cold-water in typical hot water tanks exits at the end of an extended dip tube positioned in the lower ⅓ of the tank 205 such as the arrangement shown in FIG. 13.

Flow circuit 200 thus uses hot water tank 205 as a component of its flow loop pathway (e.g., there is provided a flow-through component relative to fluid in the flow circuit 200 with an entrance point at flow port 272 and an exit port at port 280 shown in an illustration location in cover 232). That is, in the illustrated embodiment there is provided an additional T-branch section or similar type branched fluid flow exit section 276. In the illustrated T-branch section 276 the vertical component thereof extends to a safety relief valve 278 (e.g., Taco 100×1 210° F.-150 psi safety relief valve) out from which further extends L-shaped relief conduit 284 extending radially over the cover 232 and down the side of tank 205. Thus, the added T-branch or branching means 226 at this location provides for the conversion of a conventional safety valve (330—FIG. 13) into part of the heat exchange circuit 200 while still maintaining the safety function provided by such a valve 330. There can also be seen from a comparison of FIGS. 1A and 6 the providing of relief porting (using branches 276 and 290 respectively). In the illustrated embodiment the illustrated T-section 276 includes break line 286 which extends to the illustrated preferably vertically upward extending conduit 288 which forms part of the return leg of flow circuit 200 that extends away from the tank 205 to heat exchanger inlet parts 28A and 28B shown in FIG. 7. The piping extending between schematic break marker (B1). The line extension from (B1)-(B1) is variable depending on the environment and desired spacing interrelationship between the hot water tank 205 and the pellet stove or heater device 100. Variations are also possible in the illustrated sections, although what is shown (e.g., the vertical extension of the return to the base of the tank and the vertical extension out from the top of the tank while preferably utilizing a standard or preexisting port of the hot water tank (e.g., via T-section 276)) is illustrative of an exemplary embodiment of the present invention. Also, in the non-illustrated B1 to B1 section (only shown schematically in FIG. 5) there is preferably an arrangement of less that 30 feet spacing and more preferably less than 15 feet spacing as in an above floor/lower floor, generally vertically aligned arrangement for both the heater device 100 and tank 205. However, alternate embodiments include longer or short length values as with added pump capacity for longer extensions.

As seen from FIG. 5, the extension B1-B1 shown as broken away in FIGS. 5 and 7 preferably includes a cut-off valve 288 which is in fluid communication with safety relief valve 290 (e.g., a TACO 3L 150 psi safety relief valve) which is associated with heater device side section 203 just prior to fluid passage to heat exchanger 202 (e.g., within a foot of the exterior of the pellet stove panel supporting the heat exchanger 202 at apertures 28 with reference to FIGS. 5 and 7).

An exemplary embodiment features heat exchanger 202 as a brazed flat plate heat exchanger that lays flat to the side of the stove with, for example, 1000 degree caulking around the inlet and outlet conduits (e.g., ¾" NPT nipples) with the caulking provided on the inside and outside. In an alternate embodiment there is featured couplings and short (e.g., 1 to 4 inches) threaded stubs providing a cantilever arrangement for a further extension into the interior of the stove. The relative positioning and support can be fine tuned based on the stove design noting that there may be some loss of conductive heat when the heat conductor is suspended within the stove while, on the other hand, depending on the design of the stove, the heat exchanger may be positioned in a more desirable location as far as heat exchange (e.g., move in a fluid flow circulation passage or closer to the heat source, etc.

In an exemplary embodiment there is featured both a standard domestic hot water heating device (e.g., one or more internalized electric heat resistance units) combined with the heat exchange pellet stove heat source for achieving the domestic hot water heating. Further, there is preferably utilized the heat exchanger 202 as the sole heat provider whenever the heat supply of the pellet stove heat exchanger 202 is sufficient to meet the hot water demands (e.g., a switch off circuit with temperature sensor). The heat exchanger 202 can also be utilized as a supplement or dual heat supply means to lessen the energy requirements of the backup or standard heat provider (e.g., coil resistance loop or gas burner heat source for a hot water tank) in which case the control circuitry can monitor the water heat and then turn on the heat resistance elements to raise the already heated hot water being fed to the tank. Also, in some embodiments having a boiler for radiant baseboard heating or the like, there can also be avoided, by use of heat exchanger loop 200, the usage of standard heat sources such as electrical resistance elements in a hot water tank as well as usage of a boiler (e.g., oil). There is thus provided the option of switching between any one of these three sources depending on respective fuel type costs. However, for a typical hot water demand household with a pellet stove functioning at least periodically (e.g., at least 4 hours per day or a full 24 hours every other day, etc. there is considered not to be the need for standard heater (e.g., resistance coils in tank) operation. Thus, for example, in locations where the temperature remains at or below 45° F. during a given time frame (e.g., winter months) and there is much usage of the pellet stove, no oil tank or electric resistance standard heating of the domestic hot water tank need to be utilized. This is particularly true in the more northern states in the U.S. (e.g., Maine) and Canada and the like. Under an exemplary embodiment of the present invention, for example, pellet stove 100 can be run 24 hours, 7 days a week during the winter months to achieve, in essence, free hot water during that time period. That is, for instance, there can be avoided the need to run oil-fired burners or domestic hot water coils or gas feeds to achieve hot water (with oil cost subject to higher fluctuations as compared to the typically more consistent or less fluctuating wood industry waste (e.g., solid biomass fuel supplies as in pellets of sawdust waste), corn, fruit pits, and/or peanut shells, etc. Further, heat sources to supplement heat exchanger 202 includes other types of heat generation means as in solar based heat generator, which again can work together in supplemental fashion or utilized independently depending upon the circumstances.

FIG. 7 further illustrates a compact arrangement wherein heat exchanger in-feed line section 406 extends to T-section 291 which is associated with the aforementioned safety valve 290 and entrance conduit 292 with first branch line 410A and second branch line 412A shown extending transversely through the apertures 28A and 28B formed in stove panel(s) 26 (shown broken away for heat exchanger viewing). Thus, after the domestic water flow is flown from the hot water tank 205, at whatever heat level it is currently at, it arrives at heat exchanger 202 and is presented to the heat exchanger as spaced apart "in-flow" locations to help in water flow dispersion as the water flows between the various stacked plates and then exits the heat exchanger. Upon exiting the heat exchanger the water passes through exit branch lines 410B and 412B into common exit conduit 293 whereupon it is shown redirected in flow path travel by bend 1208 before extending into out-feed line 408 (shown extending running parallel and within a few inches (e.g., preferably within a 6 inch spacing) of in-feed line 406 as it runs along and away from the stove panel 26. As seen the branch extensions like 410A and 410B and 412A and 412B preferably extend out away from the exterior surface of wall panel 26 by a common distance (e.g., less than 6 inches as in about a 2 inch extension) such that the associated in-feed and out-feed lines 406 and 408 all fall within a common plane (e.g., are bisected by a common vertical plane), although various other arrangements as in a non-parallel arrangement may be dictated by the stove shape itself, the elements in the immediate environment therearound, etc.

As further shown in FIG. 7 the out-feed line 408 feeds into the flow circuit represented by broken away markers A1-A1 with the downstream portion shown in FIG. 6 as comprising the feed line section 242 shown as entering the inlet port of the pump 249 before passing through the above described piping or conduits before entering the preferred base location previously or what would often be positioned the drain spigot in a standard hot water tank.

Figure 3:
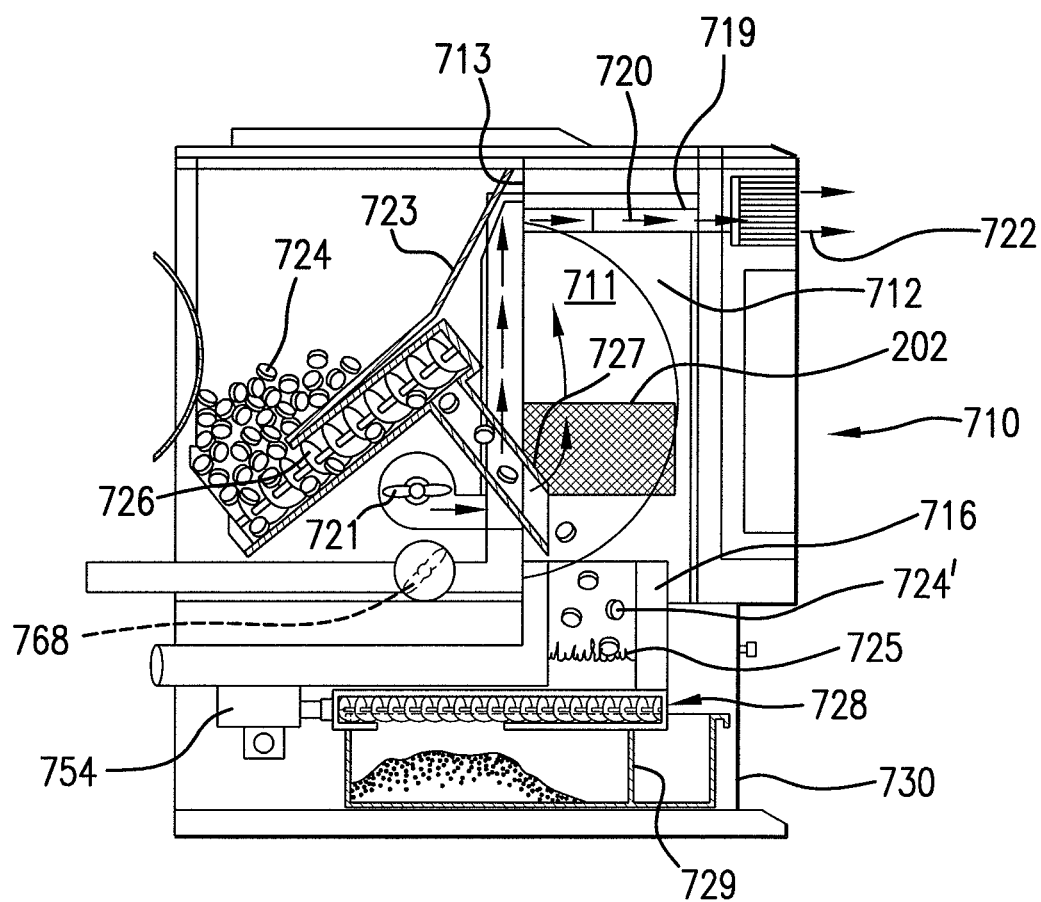
FIG. 3 shows a cross-sectional view through an alternate design of a conventional pellet stove that has been modified to include a heat exchanger in accordance with an embodiment of the present invention.

FIG. 3 shows an alternate embodiment of a heater device to represent heater device 100 in fluid heating system 300 which also is in the form of a pellet stove that has been modified to meet the heat exchange function to be provided as explained in the present application. A suitable starting point for revisions to be made can be seen in the pellet stove described in US Publication No. US 2007/0137537 (as but one other example of many suitable heater devices to be placed in the heat exchanger flow circuit 200, and which reference is incorporated herein by reference for background purposes). As shown in FIG. 3 of the present application there is featured a solid fuel heating device 710 (representing heater device 100 in this embodiment) having a combustion chamber 712 in which an exemplary cyclone gasifying combustion burner 711 is provided to produce thermal energy. The cyclone combustion burner 711 is disposed proximate to the bottom of a combustion chamber 712 and/or otherwise proximate to a fuel bed 725. In the exemplary embodiment, air is heated and drawn into a reaction zone of the burner 711.

As further shown in FIG. 3, an exemplary heat exchange arrangement in the form of hollow pipes 719 can be disposed towards the top end of the combustion chamber 712 and heated by the circulating combustion air. Ambient air, as indicated by arrows 720, is circulated through the hollow pipes 719 by a fan 721 mounted in a side wall of the heating device, or any other convenient location such as proximate the hot air exhaust area, to exhaust heated air from the pipes 719 into the ambient air, as indicated by arrow 722, whereby to heat the surrounding area of the solid fuel heating device 710. Fan 721 can be configured in various locations for circulating ambient air through pipes 719, with such pipes 719 being arranged in various manners for discharging heat to the surrounding area. Thus, this is but an additional example of the different types of heat sources 100 that can be utilized under embodiments of the invention.

The solid fuel heating device 710, as herein illustrated in the exemplary embodiment, comprises a different pellet feed assembly as that featured in FIG. 2 which features a biomass pellet, fuel and/or grain-fed space heating stove having hopper 723 configured for storage of fuel sources, such as solid fuel pellets 724, for example. Hopper 723 can comprise various sizes, shapes and configurations for storage of fuel. In accordance with an exemplary embodiment, the feed pellets are fed into a fuel bed 725 of the cyclone burner 711 by an auger 726 feeding a chute 727. In the exemplary embodiment, the solid fuel, pellets 724 entering the cyclone burner 711 are projected into the fuel bed 725 by gravity and supported by a support mechanism in the form of a support tray 728 fixedly secured under the bottom open end of the inner cylindrical wall 716. An ash collecting tray 729 is removably secured under this support tray 728 and accessible through a door 730. It is pointed out that the solid fuel pellets and grains 724 could also be fed from the bottom or the side of the unit or any other configuration for providing fuel pellets and the like onto fuel bed 725. For example, rather than hopper 723 and/or auger 726, any other mechanisms or systems for conveying materials can be suitably implemented.

As further seen in FIG. 3, there is featured heat exchanger 202 mounted (e.g., flush or suspended) on or adjacent wall panel of the burner chamber and adjacent at one end with hopper/combustion dividing wall 713. Accordingly, exchanger 202 picks up energy from the combustion gas to provide a suitable amount of energy to achieve the desired heat level in the domestic hot water as described above.

Figure 4:
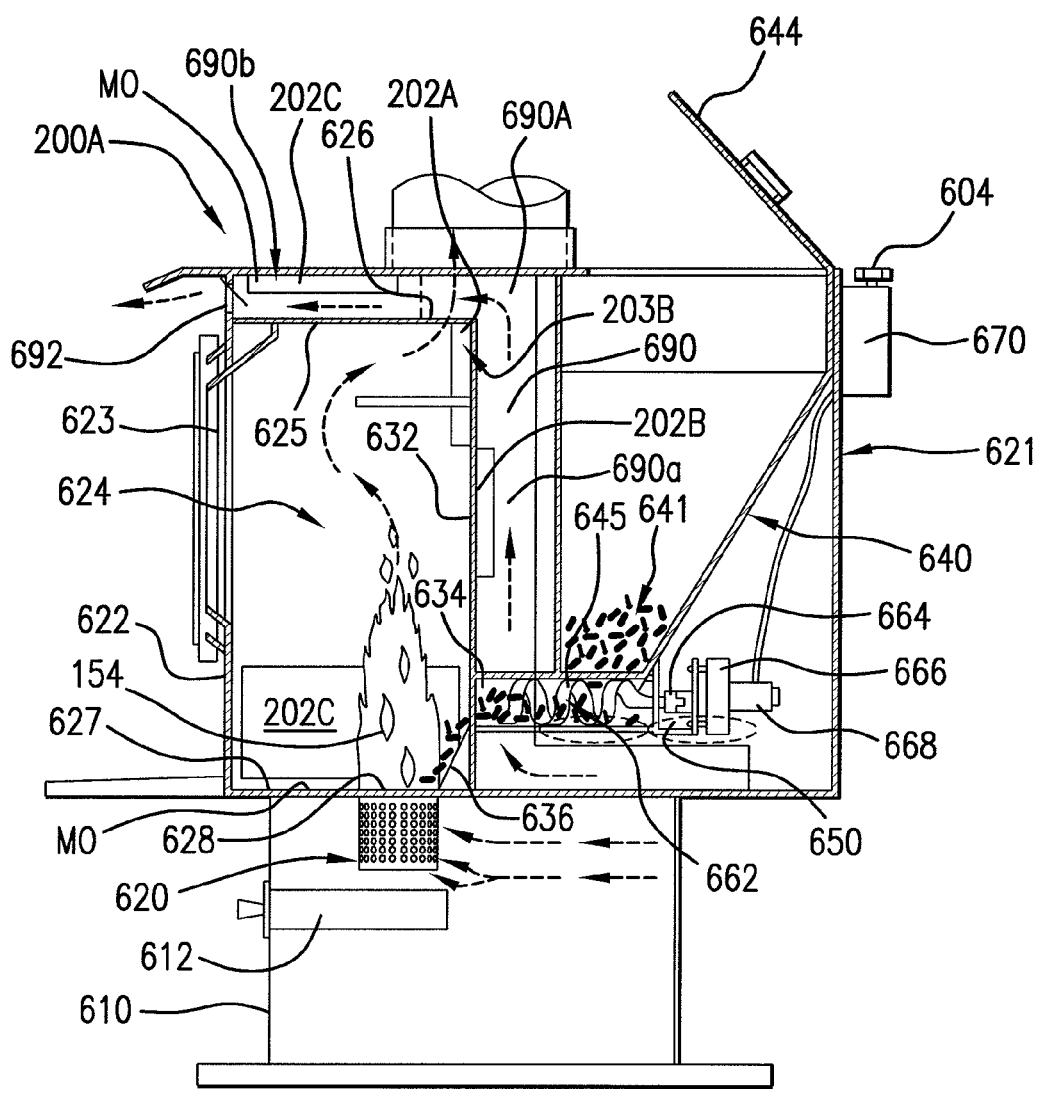
FIG. 4 shows an additional cross-sectional view through a different type conventional pellet stove that has been modified to include a heat exchanger in accordance with an embodiment of the present invention.

FIG. 4 shows an additional alternate embodiment of a heater device to represent heater device 100 in fluid heating system 300 which also is in the form of a pellet stove that has been modified to meet the heat exchange function to be provided as explained in the present application. A suitable starting point for revisions to be made can be seen in the pellet stove described in U.S. Pat. No. 5,133,266 (as but one example of many suitable heater devices to be placed in the heat exchanger flow circuit 200, and which reference is incorporated herein by reference for background purposes). FIG. 4 shows heater device 200A that comprises a housing 621 having a front door 622 with a window 623 positioned therein. Housing 621 includes combustion chamber 624 in which a significant portion of the combustion of the wood gases driven off by the initial burning of the pellets occurs. Housing 621 comprises a ceiling 625 having an aperture 626 through which exhaust gases pass out of combustion chamber 624, and a floor 627 having a bottom aperture 628 through which combustion air and wood gases are introduced into the combustion chamber. A chute 636 is preferably provided, extending between feed opening 634 and aperture 628, for transporting pellets dispensed from opening 634 to aperture 628. In an alternate embodiment (there is featured a vertical stacked and upstream/downstream shifted pair of chutes (not shown)) to help prevent backburn.

Device 200A further includes a convection system for causing room temperature air to enter and move within device 200A so as to be heated by the high temperature gases present in combustion chamber 624 and then be exhausted into the room in which device 200A is positioned. This convection system comprises a convection chamber 690 comprising a central portion 690a positioned between housing 621 and hopper 640 so as to confront the back surface of rear wall 632 of housing 621 and to be spaced slightly from the front wall of hopper 640. Hopper 640 preferably has a door 644 and a holding volume suited for holding a 50 pound bag of pellets (e.g., conventional pellets such as those identified by the label "APFI"). Convection chamber 690 also comprises an upper portion 690b which is coupled with the upper end of central portion 690a, and confronts and extends along the upper surface of ceiling 625 of housing 621. Upper portion 690b terminates in an opening 692 through which heated air present in upper portion 690b may be exhausted from the latter.

The components of device 200A include housing 621, hopper 640, feed chamber 650, feed assembly 645 (shown with feed port 646 in the bottom of hopper 640 through which feeds pellets 641 into contact with feed blade 662 having a drive connection at 664 and gear reduction box 666 and motor 668 which motor is coupled to control device 670 and associated control knob 604), and convection chamber 690. These components are all supported on a pedestal 610. The latter is designed to support these components a selected distance. Pedestal 610 includes an ash drawer 612 positioned beneath burn pot 620, through which combustion air traveling to burn pot 620 may pass. The pellet burning heating device 200A is designed to preferably operate at a combustion efficiency of about 90-98% (based on the oxygen-derived combustion efficiency formula), and to preferably emit exhaust gases having a carbon monoxide concentration, by volume, of about 0.04% or less, which device also preferably does not incorporate a fan system for introducing combustion air into, or extracting exhaust gases from, the stove. High combustion efficiency and clean burning are accomplished by providing a plurality of apertures in the burn pot 620 of the device having a predetermined size, number, and placement.

In accordance with exemplary embodiments of the present invention there is shown in FIG. 4 one or more heat exchangers 202 in heat exchanger circuit section 203A positioned as to absorb heat from the stove 200A for the supply of heat to the fluid flow circuit. In the illustrated embodiments of FIG. 4 there is shown three heat exchangers 202A to 202C in various parts of the heating device embodiment (any one of the three 202A to 202C can be used alone or in any of the potential combinations and sub-combinations). As seen, there is a flush mounted heat exchanger 202A which is mounted on the back wall 632 within the firebox 624 (the internal side relative to the burn pot location within combustion chamber 624). In an alternative embodiment relative to FIG. 4, there is shown heat exchanger 202B shown mounted flush with backwall 632 outside of the combustion chamber such that the exchanger 202B derives heat while in one chamber away from the firebox chamber (which lessens the heat collection efficiency but provides a less harsh environment to the exchanger). Heat exchanger 202C is shown mounted to the floor of the combustion changer as with mounting means MO (direct weld, fasteners, mounting brackets, etc.). The inlet/outlet ports (not shown) for the heat exchangers can be of the type where the porting is placed on the exposed large surface (e.g., like FIG. 10) or can be provided at an end edge wall (like FIG. 11) in which case the port conduits can be used to suspend the heat exchanger at the desired location. For example, the heat exchanger can be suspended in cantilever fashion rather than being supported, for example, by way of a weld connection as in a flush surface arrangement such as against the wall at reference line 632 as shown in FIG. 4. These are but a few mounting techniques and arrangements (or mounting means) suited for use in exemplary embodiment.

Alternate embodiments for heating system 100 includes providing the electric current for the flow circuit pump operation as an inclusion of a component of the control circuitry associated with the heater device in conjunction, for example, with the domestic hot water tank temperature level monitoring.

Alternate heat device sources include, for example, wood, coal and other types of stoves although a continuous feed stove, as in a pellet stove, is well suited to meet all domestic hot water requirements for an average household during seasons where the stove is utilized on a generally continuous seasonal level (e.g., Maine).

The foregoing description and examples have been set forth merely to illustrate the invention and are not intended to be limiting as modifications of the described embodiments incorporating the spirit and substance of the invention may occur to persons skilled in the art.

What is claimed:

1. A fluid heat exchange system, comprising: a fluid flow circuit comprising a heat exchange fluid flow loop, a heat absorption component in fluid communication with said flow loop, a heat exchanger in fluid communication with said flow loop, and a pump in fluid communication with said flow loop; a controlled and automated fuel supply source based heater in heat passage communication with said heat exchanger; a control unit which triggers activation of said pump upon fluid in said heat absorption component reaching or dropping below a preset temperature, and said fluid flow circuit being arranged such that during times of non-activation of said pump fluid is free to flow in unidirectional flow fashion within each of said flow loop, heat exchanger and pump of said fluid circuit based on thermodynamic temperature differentials alone, wherein said heater comprises a pellet stove with a combustion pot mounted within a combustion chamber, and said heat exchanger is mounted within the combustion chamber of said pellet stove so as to have the heat exchanger positioned flush or adjacent to a wall panel of the pellet stove and so as to be spaced sufficiently away from the combustion pot as to avoid steam generation within the fluid flow circuit, and said fluid heat exchange system being free of steam accommodation equipment, and wherein said heat exchanger is a flat plate heat exchanger suitable for heating potable water, comprising a stack of flat plates having channel passages for the flow of the potable water and wherein said fluid circuit is configured such that potable water of said fluid flow loop intermingles with potable water within said heat absorption component, and wherein said heat absorption component is a domestic hot water tank, and wherein said fluid flow loop includes an in-feed section downstream of said heat exchanger that feeds into a base region of said domestic hot water tank, and wherein the in-feed section of said fluid flow loop feeds into a location at the base of said hot water tank designed for a hot water tank valved release port, and wherein an out-feed section of the fluid flow loop exits said hot water tank at a location at a top cover of the hot water tank originally occupied by a safety release component of said hot water tank.

2. The system of claim 1 wherein said pump is positioned in line between said heat exchanger and the hot water tank.

3. The system of claim 1 wherein said water tank has a capacity of 70 to 90 gallons.

4. The system of claim 1 wherein said control unit for said pump comprises a thermostat and a temperature status switch assembly that provides for a domestic hot water temperature level setting of from 90° to 150° F. based solely on pellet stove heat.

5. The system of claim 1 wherein said domestic hot water tank has an internal heat source comprising an electric resistor or gas heat source that provides supplemental heat to the potable water in the domestic hot water tank.

6. The system of claim 5 wherein the control unit for triggering activation of said pump includes a thermostat, and said internal heat source is powered on and off based on that thermostat.

7. The system of claim 1 wherein said pellet stove has a hopper and an automated bio-mass pellet fuel supplier to the combustion pot providing a burn location in the combustion chamber of said pellet stove, and wherein said flat plate heat exchanger has an outer side wall with dual inlet ports that is positioned within said combustion chamber flush or within 4 inches of a side panel of the pellet stove defining the combustion chamber.

8. A domestic hot water heating system comprising the fluid heat exchange system of claim 1 and further comprising a heated water circulation system for dispensing water by a user, which heated water circulation system includes the heat absorption component that also is present in said fluid flow circuit and which heat absorption component is in the form of the domestic hot water tank.

9. The domestic hot water heating system as recited in claim 8 wherein said pellet stove has a hopper and an automated bio-mass pellet fuel supplier to the combustion pot providing a burn location in the combustion chamber of said pellet stove, and wherein said flat plate heat exchanger has an outer side wall with dual inlet ports that is positioned within said combustion chamber flush or within 4 inches of a side panel of the pellet stove defining the combustion chamber.

10. The system of claim 1, wherein said flat plate heat exchanger is mounted flush or in cantilever fashion on a supporting wall panel of the pellet stove as to have a heat exchanger surface exposed in the combustion chamber, and said flat plate heat exchanger has an outlet that feeds into a feed line section extending from the flat plate heat exchanger to the pump, and the pump is positioned between the feed line section and the in-feed section extending from the pump to the base of said domestic hot water tank.

11. A fluid heating system, comprising: a fluid heat exchange circuit comprising a fluid flow loop, a hot water tank in fluid communication with said fluid flow loop, a pump, and a heat exchanger; a pellet stove with an automated bio-mass fuel supply, said pellet stove having a combustion pot within a combustion chamber within which said bio-mass is combusted, and said heat exchanger being positioned within said combustion chamber as to be offset from the combustion pot and positioned closer to a heat exchanger supporting side wall panel of said pellet stove, than to a central vertical axis of said combustion pot, and said fluid heat exchange circuit being arranged free of steam accommodation equipment and arranged such that fluid in said fluid heat exchange circuit flows in uni-directional fashion and in a steam generation avoidance fashion and which is set up to include thermodynamic based freedom of flow in each of the fluid flow loop, heat exchanger and pump, and wherein the pump is configured to be in fluid through-passage mode both when in pump operation and when not in pump operation, and wherein said heat exchanger is suitable for heating potable water, and wherein said fluid circuit is configured such that potable water of said fluid flow loop intermingles with potable water within said heat absorption component, and wherein the heat exchanger is a flat plate heat exchanger, comprising a stack of flat plates having channel passages for the flow of the potable water, mounted flush or in cantilever fashion on the heat exchanger supporting wall panel of the pellet stove as to have a heat exchanger surface with dual fluid inlet ports within 6 inches of that wall panel.

12. A method of retrofitting a preexisting domestic hot water tank, comprising: providing a fluid heat exchange system having a heat exchanger and a fluid flow loop with a pump, said fluid flow loop having an in-feed section and an out-feed section, said in-feed section being positioned downstream of said heat exchanger and connected to the domestic hot water tank, said domestic hot water tank being in fluid communication with a heated water circulation system that supplies potable water to a user, said out-feed section being also connected to the domestic hot water tank and extending from said domestic hot water tank to said heat exchanger, and providing a heater which is designed for combustion of bio-mass fuel with an automated feed system for feeding the bio-mass fuel to a combustion pot within a combustion chamber of the heater, and wherein the heat exchanger is positioned within the heater as to be offset from the combustion pot as to be flush or adjacent a side wall panel of said heat exchanger, and wherein said fluid heat exchange system is free of steam accommodation equipment including check valves and provides for unidirectional flow exchange based on thermodynamic temperature differences which flow includes passage of fluid through the heat exchanger and through the pump as well as from the in-feed section, through the domestic hot water tank and through the out-feed section, and wherein the pump is configured such that during pump non-operation fluid flow though said fluid flow loop and through said pump is provided for during the unidirectional flow exchange based on thermodynamic temperature differences, and wherein said heat exchanger is suitable for heating potable water and wherein said fluid flow loop is configured such that potable water of said fluid flow loop intermingles with potable water within said domestic hot water tank, and wherein the heat exchanger is a flat plate heat exchanger, comprising a stack of flat plates having channel passages for the flow of the potable water, mounted flush or in cantilever fashion on a heat exchanger supporting wall panel of the heater as to have a heat exchanger surface with dual fluid inlet ports within 6 inches of that wall panel.

* * * * *